(12) United States Patent
Schork et al.

(10) Patent No.: US 12,483,032 B2
(45) Date of Patent: Nov. 25, 2025

(54) ELECTRICAL ENERGY SUPPLY FACILITY FOR ELECTRICALLY COUPLING TO A MULTIPHASE ELECTRICAL ENERGY SUPPLY NETWORK

(71) Applicant: Siemens Healthineers AG, Forchheim (DE)

(72) Inventors: Franz Schork, Burgthann (DE); Lothar Regenfus, Neunkirchen (DE)

(73) Assignee: Siemens Healthineers AG, Forchheim (DE)

( * ) Notice: Subject to any disclaimer, the term of this patent is extended or adjusted under 35 U.S.C. 154(b) by 5 days.

(21) Appl. No.: 18/619,249

(22) Filed: Mar. 28, 2024

(65) Prior Publication Data

US 2024/0332973 A1 Oct. 3, 2024

(30) Foreign Application Priority Data

Mar. 30, 2023 (DE) .................... 10 2023 202 962.6

(51) Int. Cl.
*H02J 3/26* (2006.01)
*H02J 3/14* (2006.01)

(52) U.S. Cl.
CPC . *H02J 3/26* (2013.01); *H02J 3/14* (2013.01)

(58) Field of Classification Search
CPC ...................................... H02J 3/14; H02J 3/26
USPC ......................................................... 307/14
See application file for complete search history.

(56) References Cited

U.S. PATENT DOCUMENTS

2021/0257848 A1 8/2021 Spesser et al.

FOREIGN PATENT DOCUMENTS

| DE | 19525417 A1 | 1/1997 |
| DE | 102012103735 A1 | 11/2013 |
| DE | 102020104133 A1 | 8/2021 |

OTHER PUBLICATIONS

Meinke, H., "The Complex Calculation of Alternating Current Circuits", published by Verlag Walter de Gruyter & Co., Berlin, 1965, 3. Auflage, Band 1156/1156a (English Title Page and Table of Contents).
IEC 61008 (VDE 0664/10) "Residual Current Operated Circuit-Breakers without Integral Overcurrent Protection for Household and Similar Causes" (English Abstract Only).
IEC 60479 (VDE V 0140/479) "Effects of Electrical Current on Humans and Livestock" (w/English Abstract).

(Continued)

*Primary Examiner* — Hal Kaplan
(74) *Attorney, Agent, or Firm* — Banner & Witcoff Ltd.

(57) ABSTRACT

A method for producing an electrical energy supply facility for electrical coupling to a multiphase electrical energy supply network. The method includes providing a multiphase inductive or capacitive load unit with a number of load terminals corresponding to a number of phases of the energy supply network, wherein each of the load terminals is electrically coupled to a respective phase of the electrical energy supply network; capturing respective electrical phase currents of the load terminals using at least one current sensor; evaluating the phase currents; establishing a residual current; and establishing the phase of the electrical energy supply network with a smallest or a largest phase current, wherein this established phase is electrically coupled to an electrical reactor, a reactance value of which is established dependent upon the residual current established.

11 Claims, 5 Drawing Sheets

(56) References Cited

OTHER PUBLICATIONS

IEC 61009 (VDE 0664/20) "Residual Current Operated Circuit-Breakers with Integral Overcurrent Protection for Household and Similar Uses" (English Abstract Only).
Directive 2014/35/EU of the European Parliament and of the Council ; of Feb. 26, 2014 on the harmonisation of the laws of the Member States relating to the making available in the market of electrical equipment for use within certain voltage limits.
TDK Product Brief 2019 "3-Line Active Filter LeaXield".
IEC 60947/4 (VDE 0660/101) "Low-Voltage Switchgear and Controlgear" (English Abstract Only).
Directive 2014/30/EU of The European Parliament and of the Council ; of Feb. 26, 2014 on the harmonisation of the Laws of the Member States relating to electromagnetic compatibility.
IEC 60364 (VDE 0100) Electrical Installations for Buildings (English Abstract Only).

ELECTRICAL ENERGY SUPPLY FACILITY FOR ELECTRICALLY COUPLING TO A MULTIPHASE ELECTRICAL ENERGY SUPPLY NETWORK

TECHNICAL FIELD

The disclosure relates to a method for producing an electrical energy supply facility for, in particular, reference potential-free and/or neutral conductor-free, electrical coupling to a multiphase electrical energy supply network, wherein the energy supply facility has a multiphase inductive or capacitive load unit with a number of load terminals corresponding to the number of phases of the energy supply network, wherein each of the load terminals is electrically coupled to a respective phase of the electrical energy supply network, wherein respective electrical phase currents of the load terminals are captured using at least one current sensor, the phase currents are evaluated and a residual current is established. The disclosure further relates to a method for operating an energy supply facility. Furthermore, the disclosure also relates to an energy supply facility for, in particular, reference potential-free and/or neutral conductor-free, electrical connection to a multiphase electrical energy supply network, having a multiphase inductive or capacitive load unit that has a number of load terminals corresponding to the number of phases of the energy supply network, and a terminal unit for electrically coupling the energy supply network, wherein the terminal unit has a number of phase terminals corresponding to the number of the phases of the energy supply network, wherein each load terminal is electrically coupled to a respective phase terminal in order to feed a respective phase current. Finally, the disclosure also relates to a magnetic resonance device with a gradient power amplifier and an energy supply facility.

BACKGROUND

Methods and energy supply facilities of the aforementioned type are extensively known, so separate documentary evidence for these is, in principle, not needed. Energy supply facilities of the aforementioned type are used, for example, but not exclusively, in devices that are used for non-destructive examination of objects and which use, for example, radiation or energy fields for the examination. Such devices are, for example, magnetic resonance systems, X-ray systems or such that are utilized for imaging examination in the manner of computed tomography, in particular, including in medical diagnostics or such. In such devices, the electrical energy supply typically takes place using an energy supply facility of the aforementioned type which, for this purpose, has a transformer as the inductive load unit. Often connected to the transformer is a rectifier unit that supplies the device with electrical energy.

Typically, the transformer is configured as a three-phase transformer for connecting to a three-phase energy supply network, such as, for example, the public energy supply network. The energy supply network is often configured as an alternating voltage network and accordingly provides alternating voltages according to the number of its phases. The alternating voltages typically have an approximately identical amplitude and an identical frequency. However, they are offset relative to one another in their phase position. The phase displacement is typically dependent upon the number of phases and, in a three-phase energy supply network is approximately 120°.

The connection of the energy supply facility is often made neutral conductor-free. The transformer can be connected on the energy supply network-side in a star connection or a delta connection. Furthermore, a corresponding multiphase, in particular, three-phase, filter can also be provided for reasons of electromagnetic compatibility and/or possibly also while maintaining network feedback.

Both the filter and also the transformer can cause, by reason, for example, of component tolerances, design limits in the construction, and/or, such as a lack of a completely symmetrical impedance in relation to the energy supply network. It can also occur that the transformer is dimensioned to be small for reasons of cost. In this regard, it is considered that, in the presence of short-term large loads in relation to the transformer, an exceeding of the electrical dimension data can occur. This can result in magnetic flux guidance within the transformer being impaired, in part, due to saturation effects in corresponding flux-guiding materials and, thereby, a coupling between an energy-supply network-side primary side of the transformer and a device-side secondary side of the transformer is worsened as compared with smaller power levels. A poor coupling can be explained, inter alia, by a rise in a leakage inductance of the transformer and/or of the corresponding portion of the transformer. By this means, an asymmetry can be evoked with regard to the energy supply network-side impedance. This can manifest, inter alia, in the form of a neutral point displacement.

This effect can become reinforced, in particular, under large loads and/or phase currents at load terminals and/or transformer terminals of the transformer. The aforementioned effects can result in a leakage current occurring or increasing. In addition, the filter can also cause a leakage current, in particular, if it has Y-capacitors. It is evident from the above that the leakage current can be power-dependent and/or current-dependent.

For reasons of electrical safety, the aforementioned devices are often electrically coupled via a residual current circuit breaker to the energy supply network. As defined in the standards, residual current circuit breakers are configured, for example, for a rated residual current of 30 mA at a frequency of 50 Hz. If a residual current and/or leakage current is captured that is greater than the rated residual current, the residual current circuit breaker trips and separates the device electrically from the energy supply network. This electrical separation is typically realized using electromechanical switch contacts. The aforementioned effects that result in the leakage current can lead, at a high power level, for example, to an undesirable triggering of a residual current circuit breaker and can thus disrupt the intended operation of the device.

In order to reduce the aforementioned problem, it has previously been attempted to implement the most symmetrical possible winding scheme and the smallest possible leakage capacitances for the transformer. Furthermore, it has already been attempted to select the rated residual current of the residual current circuit breaker to be larger, for example, 300 mA. For reasons of electrical safety, however, the latter option is not always possible. Furthermore, the problem becomes more acute, in particular, with newer devices that have multiple systems with higher leakage systems.

SUMMARY

It is an object of the disclosed aspects to reduce the aforementioned leakage current problem in as simple a manner as possible.

Regarding a method of the aforementioned type for producing an electrical energy supply facility, it is proposed, with the disclosure, in particular, that the phase of the electrical energy supply network with the smallest or largest phase current is established. This phase is electrically coupled to an electrical reactor, the reactance value of which is established dependent upon the residual current.

In relation to a method of the aforementioned type for operating an energy supply facility, it is proposed, in particular, with the disclosure that during intended operation, an electrical power level of the transformer is established, and the electrical reactor is activated dependent upon the electrical power level established.

Regarding an energy supply facility of the aforementioned type, it is proposed, with the disclosure, in particular, that it has at least one electrical reactor that is electrically coupled to one of the transformer terminals, wherein the reactor is electrically coupled to the one of the transformer terminals with which, during intended operation, the smallest or largest phase current occurs.

Regarding a magnetic resonance device, the disclosure proposes, in particular, that the energy supply facility be configured according to the disclosed aspects.

The energy supply facility serves, inter alia, for a supply of electrical energy to electrical devices. For this purpose, the energy supply facility can draw electrical energy from an electrical energy supply network such as the public electrical energy supply network, in particular, the energy supply facility can be connected to the electrical energy supply network. The energy supply facility provides the electrical energy for the electrical device. The electrical device can be a magnetic resonance system and/or a magnetic resonance examination arrangement, in particular, a magnetic resonance device, an X-ray system, or such. The energy supply facility is electrically coupled to the electrical device, in particular, connected thereto.

Underlying the disclosure is, inter alia, the concept that the aforementioned leakage current problem can be reduced in that the aforementioned neutral point displacement, in particular, at a high power level, can be at least partially compensated for with the reactor. It can thus be achieved that the leakage current can be significantly reduced, in particular, given a large electrical power level.

In this way, the necessity for a complex and expensive special design of the load unit, in particular, the transformer, can be avoided. It is also possible to avoid the protection functionality becoming worsened due to a residual current circuit breaker resulting from an increased rated residual current. In this regard, reference is made to the applicable standards, for example, IEC 60364 (VDE 0100), IEC 60479 (VDE V 0140/479), IEC 61008 (VDE 0664/10), IEC 61009 (VDE 0664/20) and IEC 60947/4 (VDE 0660/101) and/or such. These standards relate, inter alia, to the protection of persons against electric shock, in particular, in low-voltage installations.

The energy supply network is preferably a low voltage supply network based upon Directive 2014/35/EU of the European Parliament and of the Council of 26 Feb. 2014 on the harmonization of the laws of the Member States relating to the making available on the market of electrical equipment designed for use within certain voltage limits. The low voltage directive serves the purpose of ensuring a high level of protection of electrical devices with regard to the health and safety of people, pets, and working animals as well as goods and simultaneously guaranteeing the functioning of the European internal market. The energy supply facility is preferably configured to have a multiphase low voltage applied.

The reactor can have at least one electrical capacitance, for example, in the form of an electrical capacitor, or at least one electrical inductance, for example, in the form of an electrical coil, combination circuits thereof, and/or such. The reactance value of the reactor can be established, for example, using simulation, empirically, for example, while carrying out measurement series or such. For this purpose, for example, it can be provided that the reactance value is increased stepwise, and its effect on the residual current is determined. If, for a particular selection of the reactance value, the residual current is smaller than a specified comparison value, the dimensioning of the reactance value found for this can be realized in the reactor, and the reactor can be connected to and/or installed in, the energy supply facility at the predetermined position. It can also be provided that the reactance value is increased far enough until a minimum residual current is determined. In this case, the reactance value established in this way can then be established accordingly. This process management can take into account the fact that by way of a suitable selection of the reactance value, only a minimum residual current can be achieved, and on a further increase of the reactance value, the residual current rises again, for example, due to an overcompensation or such.

"Reference potential-free" means that, in particular, no neutral conductor and/or no earth conductor of the energy supply network, where available, needs to be electrically connected to the energy supply line. Preferably, it is therefore provided that exclusively the phases of the multiphase energy supply network are coupled to the corresponding load terminals and/or transformer terminals. Preferably, the energy supply network is a public energy supply network that is preferably configured to be three-phase and provides an effective voltage between the phases of approximately 400 V at approximately 50 Hz. In principle, however, the disclosure is not restricted to an alternating voltage network and/or energy supply network of this type and can also be used in energy supply networks that provide a different effective voltage and/or a different mains frequency. Furthermore, the disclosure can naturally equally be used in energy supply networks that have more than three phases, for example, four phases, five phases, six phases, or such.

Expressions such as apparent power, effective power, reactive power, equivalent resistance, impedance, reactance, and such are known to a person skilled in the art, for which reason further explanations in this regard are dispensed with. In this respect, reference is made, by way of assistance, to the textbook "Die komplexe Berechnung von Wechselstromschaltungen" [The Complex Analysis of AC Circuits] by Prof. Dr. Hans Heinrich Meinke, published by Verlag Walter de Gruyter & Co., Berlin, 1965, 3rd edition, volume 1156/1156a.

The load unit, particularly the transformer, is adapted to the energy supply network as a multiphase load unit. According to the number of phases in the energy supply network, the load unit has a corresponding number of load terminals to which at least one terminal of the load unit is connected. In the case of a transformer as the load unit, the corresponding transformer terminals of each phase winding are electrically coupled to the phases of the energy supply network.

The transformer can have any desired connection type, for example, a star connection, a delta connection, a zigzag connection, or such. The connection types for transformers are also known to a person skilled in the art so explanations with regard to the connection types of transformers are dispensed with herein. In principle, this also applies accordingly in general to the load unit.

It is also irrelevant for the disclosed aspects whether the transformer further provides a galvanic separation between a primary side, which can be electrically coupled to the energy supply network, and a secondary side, which is or can be electrically connected to device-side facilities.

The coupling of the energy supply facility to the energy supply network can provide that the transformer is coupled via a suitable filter to the phases of the energy supply network. The filter can serve, inter alia, to fulfil requirements regarding the electromagnetic compatibility, in particular, reducing the emission of wire-bound electrical disturbances. In this regard, reference is made, inter alia, to Directive 2014/30/EU of the European Parliament and of the Council of 26 Feb. 2014 on the harmonization of the laws of the Member States relating to electromagnetic compatibility. This directive relates to the electromagnetic compatibility of equipment. In particular, for the reduction of line-bound common-mode interference, typically Y-capacitors are provided in filters of the aforementioned type. As explained above, the use of such Y-capacitors can lead to a contribution to the leakage current. This is also taken into account by the disclosed aspects.

The energy supply facility, according to the disclosure, is preferably produced in accordance with the method according to the disclosure for producing the energy supply facility. Therefore, the energy supply facility according to the disclosure has an electrically determined reactor that is electrically coupled to the one of the load terminals for which, during intended operation, the smallest or largest phase current occurs. Thereby, it is possible, during intended operation to reduce, if not entirely prevent, the problem regarding the leakage current using the energy supply facility according to the disclosure.

The energy supply facility preferably has an electrical contact apparatus that is connected to all the load terminals and which has contact sites electrically connected to the respective load terminals for, preferably releasable, electrical contacting of the reactor. It is thereby possible to connect the energy supply facility electrically to the reactor during the production process and/or an initializing process, as needed. The reactor can thus be electrically connected to the respective load terminal dependent upon the smallest or largest phase current during the intended established operation. This can be achieved, for example, by way of suitable insertion of the reactor at the relevant contact site. The contact site can provide, for example, a releasable electrical plug-in connection. However, it can also be provided that the reactor has a terminal contact that can be connected to the contact site, for example, by soldering, clamping, and/or such. Naturally, in addition, further mechanical parts can be provided with which the reactor can be fixed, so that the respective contact site can be reliably contacted. By way of the releasability of the electrical connection, it can be made possible for a renewed initialization to be carried out at a later time point. It is thereby possible to be able, as required, to adapt changes occurring during intended operation by adapting the reactor, for example, with respect to the reactance value or also with respect to the coupling of the respective load terminal.

The expression "produce" herein, therefore, comprises not only a first-time and/or one-time production but can also comprise a renewed initialization being carried out. The initialization can be repeated at predetermined time points.

The disclosure is suitable, in particular, also for retrofitting in existing energy supply facilities.

If the reactor is formed by an electrical capacitor, the capacitor preferably has an electrical capacitance in a range from approximately 1 nF to approximately 250 nF, preferably in a range from approximately 10 nF to 150 nF, particularly preferably in a range from approximately 50 nF to approximately 150 nF, particularly preferably in the region of approximately 100 nF. Preferably, the electrical capacitance of the capacitor is selected to be in a range of a capacitance of a capacitive coupling of the load unit.

The magnetic resonance device preferably has at least one patient receiving region, a main magnet, a gradient coil unit, a high frequency antenna unit, a control unit, and an energy supply facility.

It is further proposed that the electrical contact apparatus has two electrical contact sites for each of the load terminals, wherein the electrical contact apparatus is electrically coupled to the load terminals in series connection. The respective load terminals are thus electrically coupled via the contact apparatus to the respective phase terminals of the terminal unit. For example, a respective contact pair provides an electrical interruption between the respective load terminal and the respective phase terminal. In the connected state, the reactor, which has at least two electrical terminal contacts, can provide the electrical connection. In the further contact pairs, an electrical bridge, for example, a wire connection can be provided. Consequently, in the phase in which the smallest or largest phase current occurs during intended operation, the reactor is connected to the two respective electrical contact sites. The further pairs of contact sites are each connected to one another via an electrically conductive connection. In this way, the reactor can additionally be connected in series in the respective phase in which the smallest phase current occurs. The disclosure can, therefore, be realized and constructed in a simple manner. In this way, the reactor is connected only in the phase in which the smallest or largest phase current occurs. The other phases are substantially directly electrically coupled by way of the electrical contact apparatus to the respective load terminals.

Alternatively or additionally, it can be provided that the electrical contact apparatus for each of the phase terminals has exactly one electrical contact site, wherein the electrical contact apparatus has at least one further contact site that is electrically coupled, for example, to an electrical earth potential. In this way, a connection is created with the reactor between the respective phase in which during intended operation, the smallest or largest phase current occurs and the electrical earth potential. This configuration also enables a corresponding improvement to be achieved in relation to the leakage current. Furthermore, in this development, no additional electrically conductive bridges need to be provided.

According to one development, it is proposed that the reactor has an electrical inductance, which is connected in series to the load terminal at which the largest phase current occurs during intended operation. In this case, the reactor is preferably formed by the electrical inductance. The use of a reactor in the form of an electrical inductance can be combined particularly advantageously with the electrical contact apparatus that provides two electrical contact sites for each of the load terminals. In this way, the series connection of the electrical inductance can be realized particularly easily and cost-effectively.

A development further provides that the reactor has an electrical capacitance, which is connected between the load terminal at which the smallest phase current occurs during intended operation and the electrical earth potential. This electrical development can advantageously be combined with the contact apparatus that has exactly one electrical contact location or one contact site for each of the load terminals. With the electrical capacitance, which preferably has an electrical capacitor, a corresponding electrical connection can be created between the respective load terminal at which the smallest phase current occurs during intended operation and the electrical earth potential. This aspect is also suitable for reducing the leakage current within the meaning of the disclosure. Naturally, combinations of the different aspects can also be provided.

According to an advantageous development, it is proposed that the energy supply facility has an electrical switch element for activating the reactor. This development has the advantage that the effect of the reactor does not need to be permanently activated. Rather, the electrical switch element makes it possible that the reactor only needs to be activated when needed. It proves to be particularly advantageous if the electrical switch element activates the reactor only in the event of a large electrical power level. For this purpose, it can be provided that the power level and/or the phase currents are captured using respective sensors, and corresponding sensor signals are evaluated in order to establish the corresponding power level and are compared with a predetermined comparison value. This aspect also proves to be particularly advantageous if, given the smallest power levels, the reactor could have a disadvantageous effect on the leakage current. The electrical switch element can be formed, for example, by way of an electromechanical switch element or by way of an electronic switch element.

An electronic switch element within the meaning of this disclosure is a preferably controllable electronic switch element, for example, a transistor, a thyristor, or combination circuits thereof, in particular, with freewheeling diodes connected in parallel, for example, a metal oxide semiconductor field-effect transistor (MOSFET), an insulated gate bipolar transistor (IGBT), preferably with integrated freewheeling diodes or such.

The switching operation of a transistor means that in a switched-on state, a very small electrical resistance is provided between the terminals forming the switching path so that a high current flow is possible with a very small residual voltage. In the switched-off state, the switching path of the transistor has a high resistance, which means that it provides a high electrical resistance so that even with a high voltage present across the switching path, substantially no, or only a very low, in particular, negligible, current flow takes place. This is different in linear operation which, however, is not used for clocked energy converters.

The reactor can be provided as a separate component. In principle, however, it can be integrated at least partially into the filter or can be formed at least partially by one or more components of the filter.

The determination of the reactance value can be at least partially automated using a determining device that can be releasably electrically coupled to the energy supply facility, at least during the production process. The determining device can be coupled for signal exchange to the current sensors and can be configured to establish the residual current. Furthermore, the determining device can be releasably electrically coupled to the load terminals in order to simulate an adjustable reactor. Using an algorithm, it can then be determined to which of the phases the reactor should be connected and what reactance value it should have. For this purpose, the determining device can have a program-controlled computer unit that at least partially provides the functionality of the determining device. In dependence thereon, the reactor can be determined and connected to the energy supply facility.

Furthermore, it is proposed that a reactance value of the electrical reactor is adjusted dependent upon the established electrical power level of the load unit, in particular, the transformer. This development permits the reactance value to be adjusted at least partially during intended operation of the energy supply facility. For this purpose, it can be provided that the residual current is established at predetermined time points or at least partially continuously. In dependence thereon, a reactance value that is to be adjusted can be determined. The reactor can be configured to be adjustable so that its reactance value can be changed. For this purpose, the reactor can have an adjusting terminal that is connected for signal exchange with the control unit of the energy supply facility. Thus the possibility exists that the control unit adjusts the reactance value dependent upon the respectively established residual current. This adjusting process can be repeated at predeterminable time points or on occurrence of predetermined events. A predetermined event can be, for example, a large power demand placed on the energy supply facility or such.

Although the method can, in principle, preferably be used in the production of the energy supply facility, it is not restricted thereto. It is also possible to use the method according to the disclosure at predeterminable time points and/or given specifiable events, for example, in order, by way of the intended use, to take account of changes in the energy supply facility.

For application cases or application situations that can arise with the method and which are not explicitly described here, it can be provided that according to the method, an error message and/or a request for input of a user feedback is output and/or a standard setting and/or a predetermined initial state is set.

The features and combinations of features mentioned in the description above and the following features and combinations of features mentioned in the description of the drawings and/or shown in the drawings alone are usable not only in the respective combination given but also in other combinations without departing from the scope of the disclosure.

The exemplary aspects set out in the following are preferred aspects of the disclosure. The features and combinations of features mentioned in the description above and also the features and combinations of features mentioned in the description below of exemplary aspects and/or shown in the drawings alone are usable not only in the respective combination given but also in other combinations. Aspects of the disclosure which are not explicitly shown in the figures and described, but which arise and can be created through separated feature combinations from the aspects described are therefore also included and/or to be considered as being disclosed. The features, functions, and/or effects revealed on the basis of the exemplary aspects can, considered by themselves, each represent individual features, functions, and/or effects to be regarded as independent of one another, which each also further develops the disclosed aspects. Therefore, the exemplary aspects should also comprise other combinations than those in the aspects described. Furthermore, the aspects described can also be enhanced with other features, functions, and/or effects of the disclosure that have already been described.

BRIEF DESCRIPTION OF THE DRAWINGS

In the figures, the same reference signs denote the same features and/or functions.

Independent of the grammatical term usage, individuals with male, female, or other gender identities are included within the term.

In the drawings.

DETAILED DESCRIPTION

Figure 1:
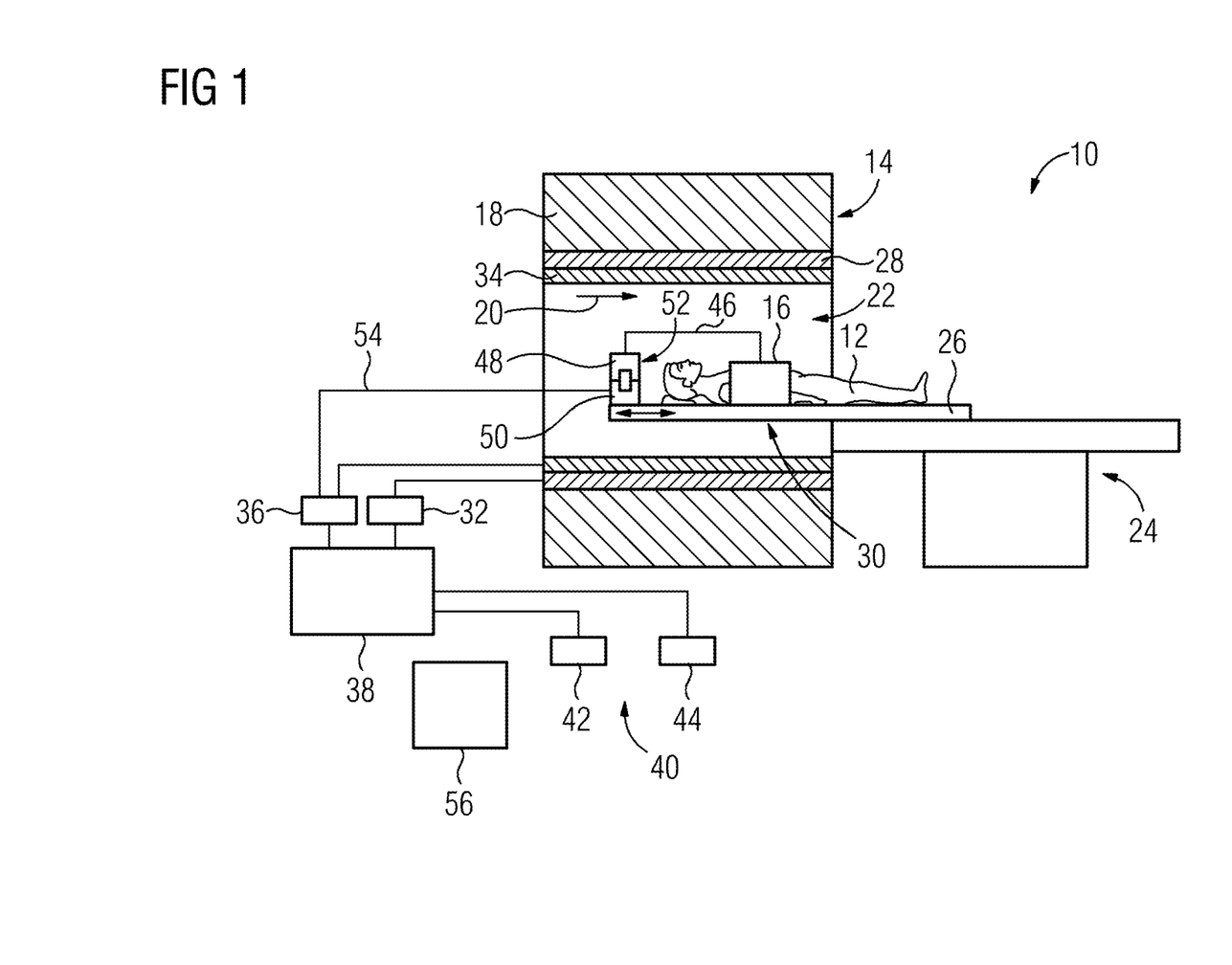
FIG. 1 shows a magnetic resonance examination arrangement with a magnetic resonance device and an MR local coil connected to the magnetic resonance device, which is arranged on a patient in order to carry out an examination on the patient.

FIG. 1 shows, in a partially sectional view, a magnetic resonance examination arrangement 10 that has a magnetic resonance device 14 and a local coil 16. The magnetic resonance examination arrangement 10 serves, in the present case, as an imaging method for the medical examination of a patient 12.

The magnetic resonance device 14 has, inter alia, a gradient power amplifier (GPA) and a main magnet 18. The gradient power amplifier is not shown in FIG. 1. The main magnet 18 serves to generate a strong, in particular, temporally constant, main magnet field in a direction 20. The magnetic resonance device 14 further has a patient receiving region 22 which, in the present case, is provided as a tunnel and which serves to receive the patient 12. In the present case, the patient receiving region 22 is configured substantially cylindrical and is surrounded in a peripheral direction by the main magnet 18. In principle, however, the patient receiving region 22 can also be configured differently to this.

The magnetic resonance device 14 further has a patient positioning apparatus 24 which enables the patient 12 to be moved into the patient receiving region 22. For this purpose, the patient positioning apparatus 24 has a patient table 26 that is arranged able to be moved a least partially within the patient receiving region 22.

The magnetic resonance device 14 also has a gradient coil unit 28 by means of which magnetic field gradients can be created that can be used for a position encoding during an imaging examination. The gradient coil unit 28 is controlled, in the present case, using a gradient control unit 32 of the magnetic resonance device 14. The main magnet 18 and the gradient coil unit 28 form a magnetic field source.

The magnetic resonance device 14 further has a high frequency antenna unit 34, which, in the present aspect, is fixedly integrated into the magnetic resonance device 14 as a body coil. The high frequency antenna unit 34 is controlled using a high frequency antenna control unit 36 of the magnetic resonance device 14. It is hereby possible to generate high frequency magnetic resonance sequences in the examination region 30. During intended operation of the magnetic resonance device 14, an excitation of atomic nuclei in the examination region 30 in the patient 12 can be achieved. Through relaxation of the excited atomic nuclei, MR signals are generated. The MR signals can be received using the high frequency antenna unit 34.

For controlling the components of the magnetic resonance device 14, the magnetic resonance device 14 has a control unit 38. The control unit 38 controls the magnetic resonance examination arrangement 10 centrally, for example, with regard to the performance of a predetermined examination on the patient 12, in particular, the performance of a predetermined imaging gradient echo sequence. Furthermore, the control unit 38 has an evaluating unit (not shown in detail) by means of which received MR signals that are captured during the examination can be evaluated.

The magnetic resonance device 14 further has a user interface 40 that is connected, for communication purposes, to the control unit 38. The user interface 40 has a display unit 42 and an input unit 44 which are each connected, for communication purposes, to the control unit 38. Via the display unit 42, visual data and information, evaluation results, for example, imaging results, parameters relating to the evaluation, and/or such can be displayed. The display unit 42 can have, for example, a monitor or such. Using the user interface 40, it is possible for a user of the magnetic resonance device 14 and the magnetic resonance examination arrangement 10 to feed data to the control unit 38, for example, parameters for the execution of the examination, control data, information, and/or such.

In order to supply the magnetic resonance device 14, in particular, the gradient power amplifier, with electrical energy, the magnetic resonance device 14 is connected to an energy supply facility 56. The energy supply facility 56 is configured, in the present case, as part of the magnetic resonance examination arrangement 10 and separate from the magnetic resonance device 14. In alternative aspects, the energy supply facility 56 can also be at least partially a component of the magnetic resonance device 14. The energy supply facility 56 can be provided exclusively in order to supply the magnetic resonance device 14 with electrical energy. However, it can also be provided that the energy supply facility 56 supplies further facilities of the magnetic resonance examination arrangement 10 with electrical energy.

It is evident from FIG. 1 that a local coil 16 is arranged on the patient 12 in the examination region 30. In the present case, the local coil 16 is arranged on a surface of the patient 12 in the examination region 30. The local coil 16 has a connecting cable 46 that is connected for communication purposes and/or for signal exchange in a connection region 52 to a terminal cable 54 of the magnetic resonance device 14. In the connection region 52 for this purpose, a coil connecting element 48 is provided which, in the present case, is fixedly connected to the connecting cable 46. In the present case, the coil connecting element 48 is configured as a plug.

In the connection region 52, a device connecting element 50 is provided which, in the present case, is fixedly connected to the terminal cable 54. With the coil connecting element 48 and the device connecting element 50, a releasable connection of the local coil 16 to the magnetic resonance device 14 can be realized in the connection region 52. In this way, it is possible to couple a respective local coil 16 to the respective magnetic resonance device 14. The device connecting element 50 can be configured as a socket. In the present case, the connection region 52 is a standardized connection region so that a connection of any desired local coils 16 to any desired magnetic resonance devices 14 can be achieved on the basis of this standard. Both the coil connecting element 48 and also the device connecting element 50 have a screening in the present case.

Only a single connecting unit 52 for connecting a single local coil 16 is provided in FIG. 1. In alternative aspects, it can naturally be provided that a plurality of connecting units 52 are provided, which enables more than a single local coil to be connected. It can further be provided that the device connecting element 50 can be arranged on any desired suitable site of the patient table 26. It can also be provided that more than a single device connecting element 50 is provided, wherein preferably the plurality of devices connecting elements 50 can be arranged at different positions, in particular, of the patient table 26. If required, the high frequency antenna unit 34 can be configured and adapted accordingly.

Figure 2:
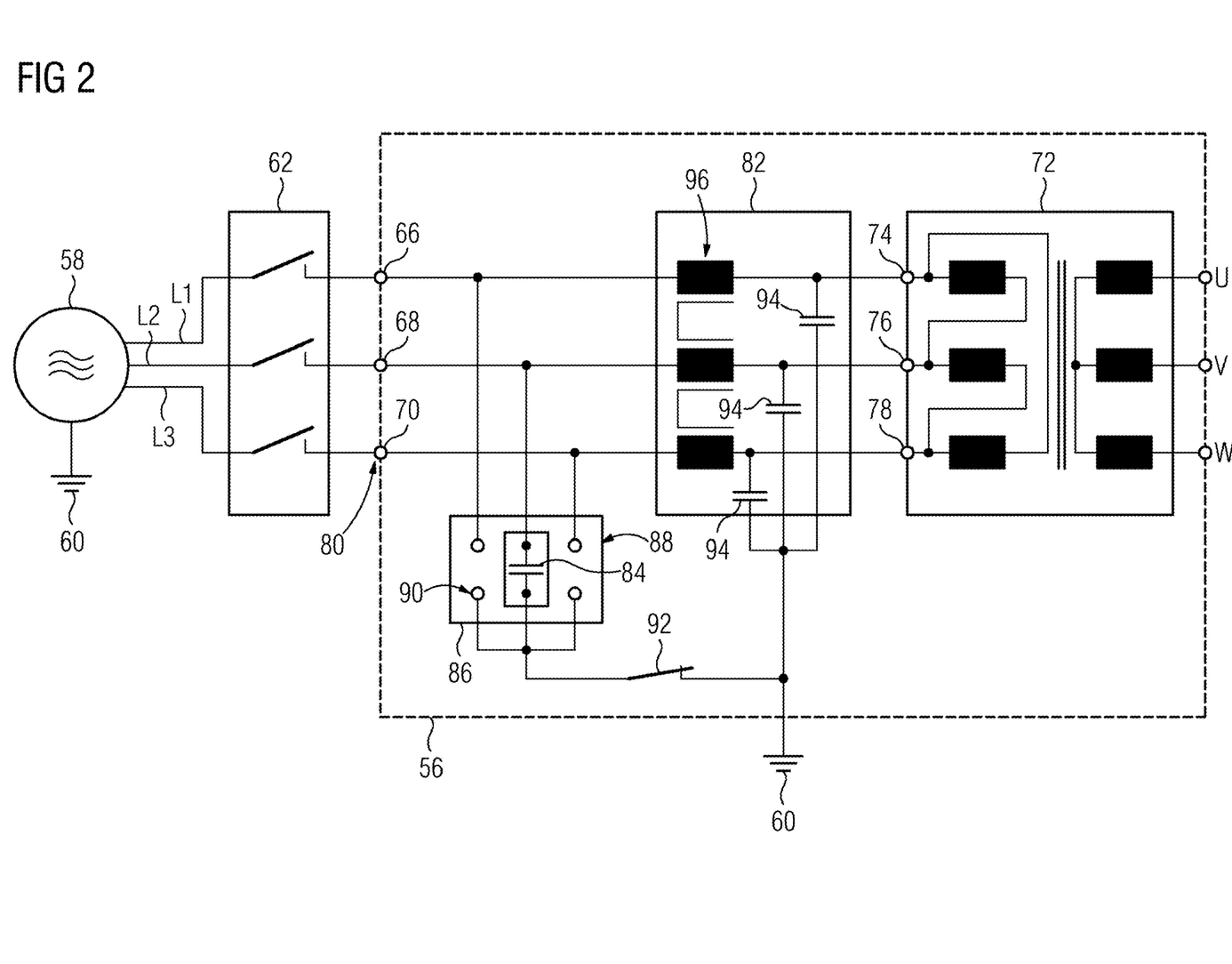
FIG. 2 shows, in a schematic block circuit diagram, an energy supply facility as included by the magnetic resonance examination arrangement of FIG. 1.

FIG. 2 shows, in a schematic block circuit diagram, the energy supply facility 56 as included by the magnetic resonance examination arrangement 10 of FIG. 1. In the present case, the energy supply facility 56 is connected via a residual current circuit breaker 62 to a three-phase energy supply network 58. In the present case, the three-phase energy supply network 58 is a public energy supply network that provides a three-phase alternating voltage with an effective value of approximately 400 Volt between the respective phases at a frequency of approximately 50 Hz. The energy supply network 58 provides a first phase L1, a second phase L2, and a third phase L3, each of which provides an alternating voltage with an amplitude of approximately 325 Volt. In the present case, the alternating voltages of the three phases L1, L2, L3 are phase-offset by approximately 120°.

The alternating voltages of the phases L1, L2, L3 are provided related to an electrical earth potential 60. The energy supply network 58 can be formed, for example, by an IT system or such. IT systems are preferably used, for example, in operating theatres of hospitals since an interruption of the power supply can present a risk to the life of the patient. IT systems are, however, often also employed in intensive care units of hospitals. Further uses in industry also exist. The use, advantages, and effects of different types of energy supply networks are known to the person skilled in the art so a further detailed explanation thereof is herein dispensed with.

In FIG. 2, it is apparent that the phases L1, L2, L3 of the energy supply network 58 are electrically coupled via the residual current circuit breaker 62 to respective phase terminals 66, 68, 70 of the energy supply facility 56. The function of the residual current circuit breaker 62 is also known to the person skilled in the art so a detailed explanation thereof is herein also dispensed with.

In the present case, it is provided that the residual current circuit breaker 62 is configured for a rated residual current or tripping current of approximately 30 mA. For this purpose, the functionality of the residual current circuit breaker 62 comprises the establishing of a residual current of the respective phase currents of the respective phases L1, L2, L3. This residual current substantially corresponds to the leakage current that flows from the energy supply facility 56 to the electrical earth potential 60. As soon as this leakage current reaches the value of approximately 30 mA, the residual current circuit breaker 62 trips and separates the phases L1, L2, L3 from the respective phase terminals 66, 68, 70. By this means, a corresponding protection, as is also required, inter alia, by the standards, is achieved.

The energy supply facility 56 is configured in the present case as neutral conductor-free. The energy supply facility 56 serves for reference potential-free electrical connection to the three-phase electrical energy supply network 58. In the present case, the connection is configured as neutral conductor-free.

The energy supply facility 56 has a terminal unit 80 for electrically coupling the energy supply network 58. The terminal unit 80 has a number of phase terminals 66, 68, 70 corresponding to the number of phases L1, L2, L3 of the energy supply network 58. Thus, the phase terminal 66 is electrically coupled to the phase L1, the phase terminal 68 to the phase L2 and the phase terminal 70 to the phase L3. The electrical coupling takes place via the residual current circuit breaker 62.

The energy supply facility 56 has a transformer 72 as the load unit with transformer terminals 74, 76, 78 as load terminals. Each transformer terminal 74, 76, 78 is electrically coupled via a filter unit 82 to the respective phase terminal 66, 68, 70 in order to conduct a respective phase current. The filter unit 82 is included by the energy supply facility 56 and serves, inter alia, to reduce line-bound disturbances. As shown in FIG. 2, the filter unit can have a three-phase current-compensated choke 96 in connection with respective Y-capacitors 94. The filter unit 82 is electrically coupled to the earth potential 60.

Aside from the transformer terminals 74, 76, 78, the transformer 72 has terminals for secondary phases U, V, W. A three-phase bridge rectifier (not shown in the drawings) is connected to the terminals for secondary phases U, V, W.

The transformer 72 is configured as a three-phase transformer, wherein a primary side is configured in delta connection and a secondary side is configured in star connection. Dependent upon need, however, the connection type of the primary side and/or of the secondary side can also vary. For example, it can be provided that both the primary side and also the secondary side are each star connected.

The energy supply facility 56 further has an electrical contact apparatus 86 that is electrically coupled to all the transformer terminals 74, 76, 78. The contact apparatus 86 has contact sites 88 electrically connected to the respective transformer terminals 74, 76, 78. The electrical contact apparatus 86 has exactly one electrical contact site and/or one contact location 88 for each of the transformer terminals 74, 76, 78. In each case, one of the contact locations 88 is electrically coupled to one of the transformer terminals 74, 76, 78. In addition, the electrical contact apparatus 86 has a further contact location 90 that is electrically coupled to an electrical earth potential 60. In the present case, it is provided that for each contact location 88, a corresponding contact site 90 is provided so that a contact location pair is formed which can be connected to a two-pole configured reactor.

In the present case, the transformer 72 is configured as a transformer galvanically separated between the primary side and the secondary side. However, this is not relevant for the disclosure. A galvanic separation, therefore, does not need to be provided by way of the transformer 72.

In the present case, the filter unit 82 comprises at least the current-compensated choke 96 and for each of the phases L1, L2, L3, a Y-capacitor 94. The Y-capacitors 94 are each electrically coupled with one of their terminals to one of the phases L1, L2, L3. The other terminal of each of the Y-capacitors 94 is connected to the electrical earth potential 60.

In the present case, it is provided that the energy supply facility 56 has a capacitor 84 as an electrical reactor, which is electrically coupled to one of the transformer terminals, in the present case, the transformer terminal 76. During intended operation, the smallest phase current occurs at this transformer terminal 76. Since during intended operation, in particular, at a high power level, as a result of tolerances and/or asymmetries, a non-negligible leakage current occurs, this can have undesirable consequences. In particular, the possibility exists that the residual current circuit breaker 62 undesirably trips even though no fault actually exists. This problem can be reduced using the capacitor 84, as described in greater detail below.

For this purpose, it is provided that at least when the energy supply facility 56 is produced, respective electrical phase currents of the transformer terminals 74, 76, 78 are captured using respective current sensors 100, 102, 104 (FIG. 3), and the phase currents are evaluated in order to establish a residual current.

Figure 3:
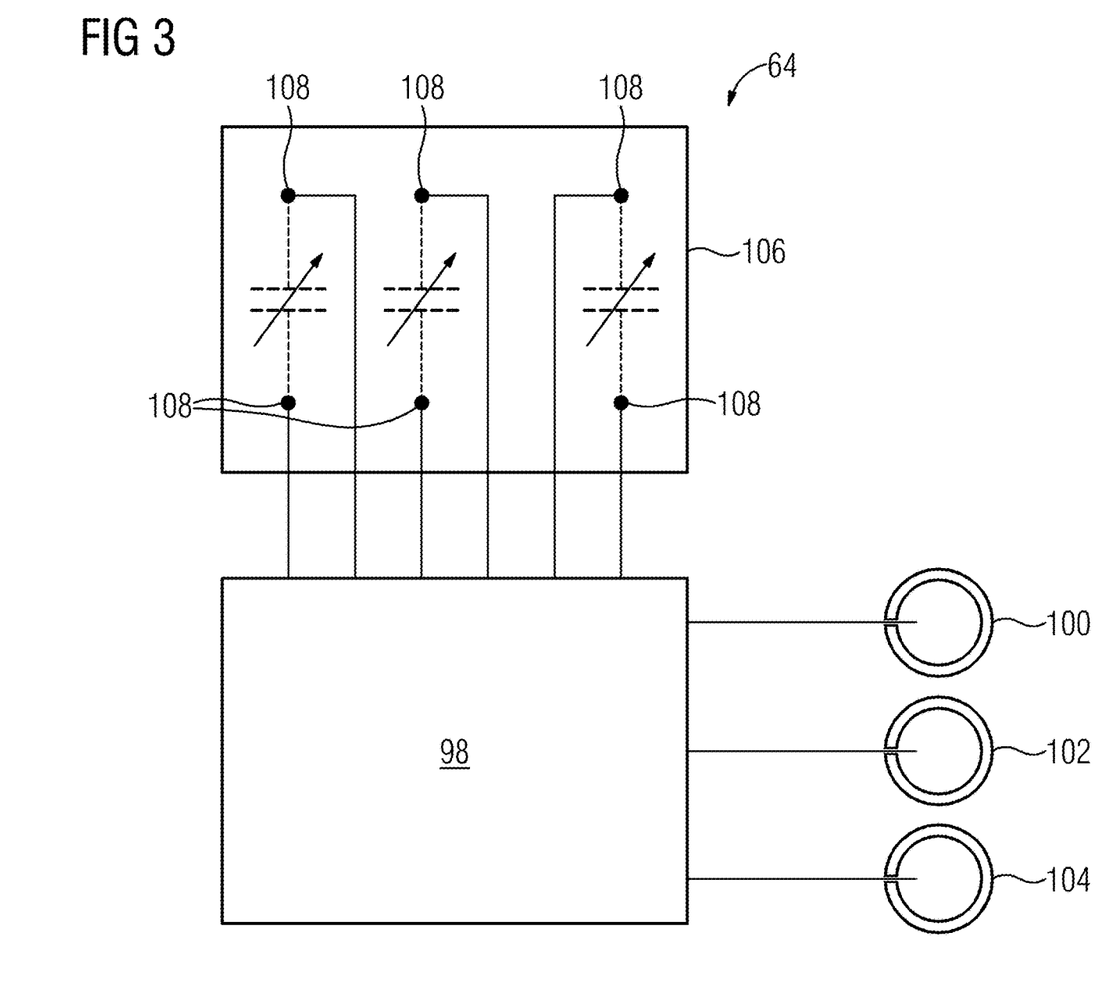
FIG. 3 shows, in a schematic block circuit diagram, a determining device for determining a reactor for the energy supply facility of FIG. 2.

In the present aspect, this is carried out using a determining device 64 during the production of the energy supply facility 56, as illustrated in FIG. 3 with an electrical schematic block circuit diagram. The determining device 64 has the current sensors 100, 102 and 104 which can be configured in the manner of respective current measuring calipers in order to be releasably connected to corresponding conductor portions of the energy supply facility 56 in which the respective phase currents of the phases L1, L2, L3 occur. Furthermore, the determining device 64 has a control unit 98 to which the current sensors 100, 102, 104 are connected in order to provide respective sensor signals. The residual current can be established using a control unit 98.

Furthermore, the determining device 64 has a terminal unit 106 connected to the control unit, having six contact posts 108. The contact posts 108 are connected via electrical lines to a control unit 98 of the determining device 64. The contact posts 108 serve, for the determination of the reactor and its reactance value, to be releasably electrically connected to the contact sites 88, 90.

Between respective pairs of the contact posts 108, using the control unit 98, a respective adjustable electrical capacitance can be provided, as shown in FIG. 3 by the dashed representation of adjustable capacitors. The respective capacitance value can be adjusted using the control unit from approximately 0 F to approximately 500 nF. The control unit 98 carries out an automated sequence in which respective capacitance values between the contact posts 108 are increased in order to establish the effects on the residual current.

Firstly, the phase on which the smallest phase current occurs is determined. In this phase, the capacitance value is then changed as the reactance value until a reduction of the residual current and/or the leakage current can be achieved. For this purpose, the residual current is compared with a predetermined comparison value. As soon as the comparison shows that the residual current is smaller than the comparison value, the established capacitance value can be output. The determining device 64 can then be separated from the energy supply facility 56 again.

For the determined phase, a capacitor 84 with the established and/or determined capacitance value can then be connected to the contact apparatus 86. For this purpose, the capacitor 84 is soldered to the relevant contact posts. Alternatively, the capacitor 84 can also be electrically connected using clamps or plug contacts.

In this way, the energy supply facility 56 already receives the relevant reactor during production, specifically in the present case, the capacitor 84 with which during intended operation, in particular, at high power levels, a reduction of the leakage current can be achieved.

Figure 4:
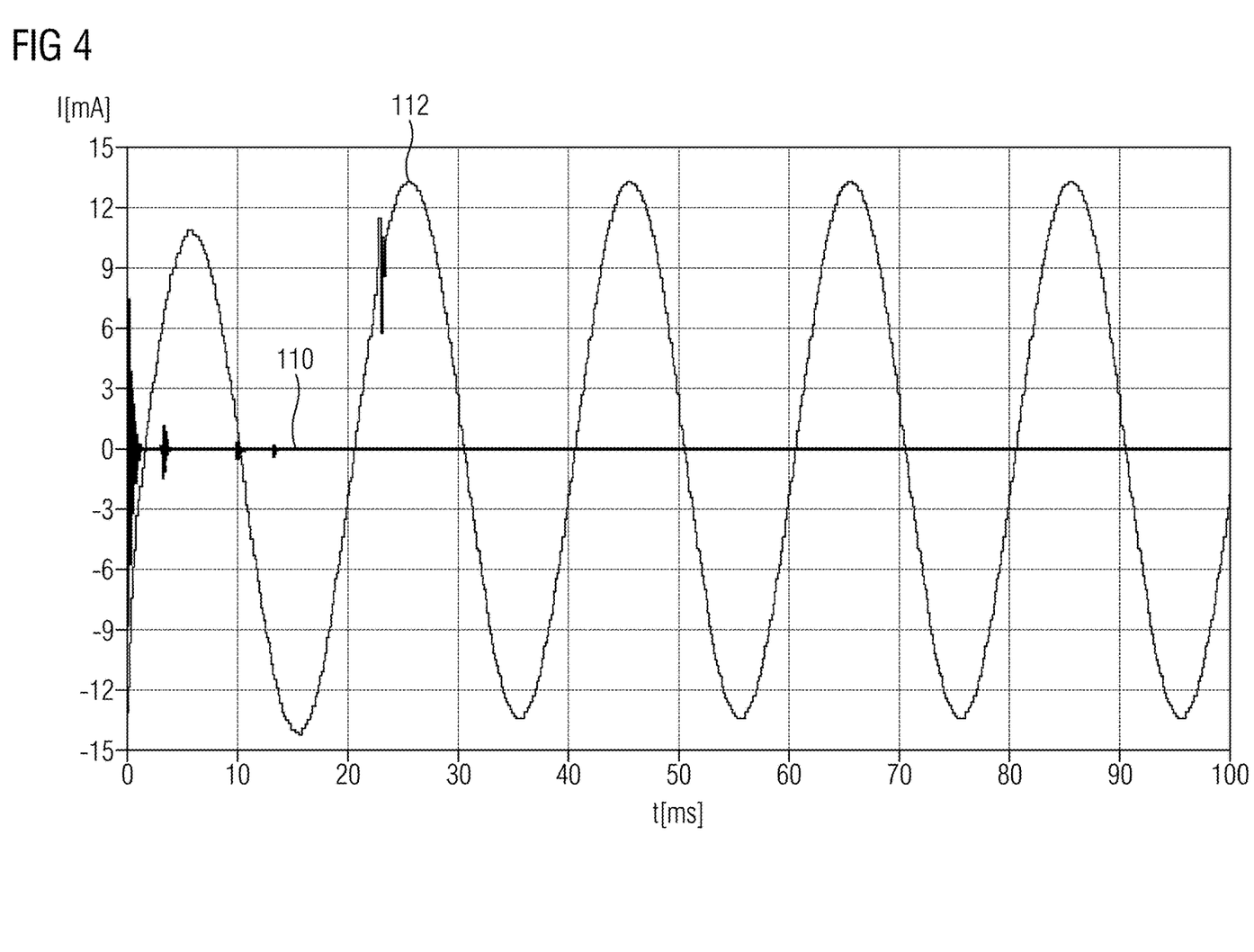
FIG. 4 shows a schematic graphical representation in which using two graphs, a leakage current at a low power level and at a high power level without the reactor are shown.
Figure 5:
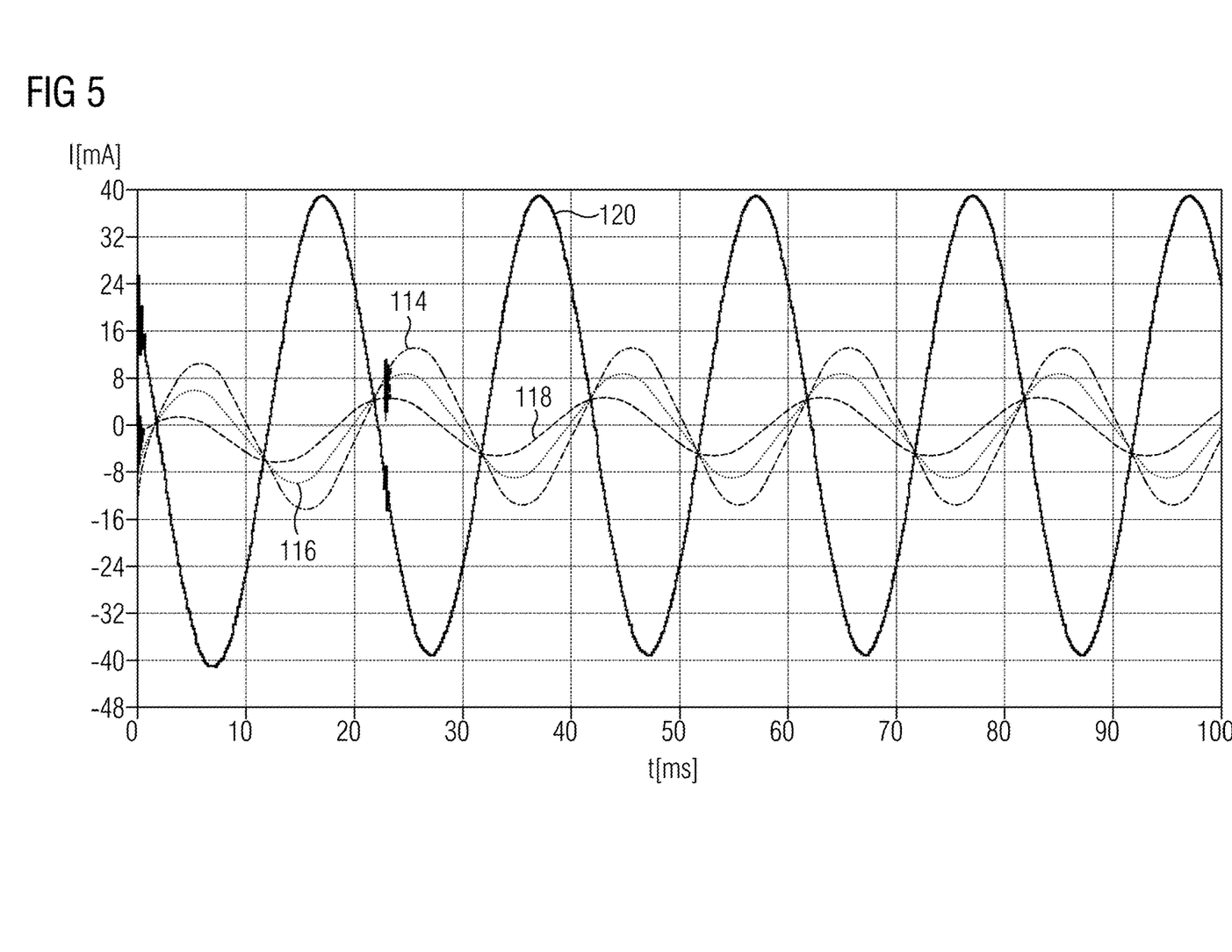
FIG. 5 shows a schematic diagram similar to FIG. 4, wherein using a plurality of graphs, the effects of the reactor on the leakage current are shown.

The effect of the disclosed aspects will now be further elucidated by reference to the graphs in FIGS. 4 and 5.

FIG. 4 shows in a schematic graphical representation the residual current that has been established using the determining device 64. An ordinate represents the current, and an abscissa represents time. For a small power level of the energy supply facility 56, a graph 110 shows that the leakage current is substantially in the region of approximately zero mA. If, however a large power level is provided by the energy supply facility 56, even if only briefly, it can be seen that due to tolerances and asymmetries, a significant leakage current occurs, as shown by the graph 112. This leakage current can lead to a false triggering of the residual current circuit breaker 62.

FIG. 5 shows a schematic graphical representation similar to FIG. 4, wherein using graphs 114 to 120, the effects at high power levels are shown if a capacitor 84 is provided for the phase with the smallest phase current. It is evident that the graph 114 shows the residual current for a capacitance of approximately zero farad. A graph 116 shows the residual current for a capacitance value of 50 nF at otherwise identical conditions. A graph 118 shows the residual current for a capacitance value of approximately 100 nF. It is evident that with increasing capacitance value, an amplitude of the residual current decreases. With the graph 120, it is further shown how the leakage current behaves if the capacitance value is 500 nF. A significant increase in the residual current is the result. This is a consequence of overcompensation.

Overall, the disclosure makes it possible to reduce a leakage current problem by suitable selection of a reactor, in this case, a capacitor. Alternatively or additionally, a corresponding inductance can also be provided.

From FIG. 2, it is also evident that the capacitor 84 is electrically connected via an electric switch element 92 to the earth potential 60, specifically dependent upon its switched state. The electric switch element 92 is formed, in the present case, by a relay that is controlled with respect to its switched state by a control unit (not shown) of the energy supply facility 56. For this purpose, the control unit (not shown) captures an electrical power level of the energy supply facility 56. The electrical power level is compared with a comparison value. Provided the electrical power level is lower than the comparison value, the switch element 92 remains in the switched-off switched state, which means that it provides an electrical interruption. As soon as the electrical power level is higher than the comparison value, the switch element 92 is switched into the switched-on switched state and an electrical connection is created between the capacitor 84 and the earth potential 60. It can be achieved, in this way, that with a smaller power level, any unfavorable effect of the capacitor 84 can be reduced or prevented. This aspect enables the disclosed aspects to be further improved.

The exemplary aspects serve only to explain the disclosed aspects and are not intended to restrict them.

The invention claimed is:

1. A method for producing an electrical energy supply facility for reference potential-free and/or neutral conductor-free electrical coupling to a multiphase electrical energy supply network, comprising:
   providing a multiphase inductive or capacitive load unit with a number of load terminals corresponding to a number of phases of the energy supply network, wherein each of the load terminals is electrically coupled to a respective phase of the electrical energy supply network;
   capturing respective electrical phase currents of the load terminals using at least one current sensor;
   evaluating the phase currents;
   establishing a residual current; and establishing the phase of the electrical energy supply network with a smallest or a largest phase current, wherein the phase is coupled to an electrical reactor, a reactance value of which is established dependent upon the residual current established.

2. The method for operating the energy supply facility of claim 1, further comprising, during intended operation:
establishing an electrical power level of the load unit; and
activating the electrical reactor dependent upon the electrical power level established.

3. The method of claim 2, further comprising:
adjusting the reactance value of the electrical reactor dependent upon the established electrical power level of the load unit.

4. An energy supply facility for reference potential-free and/or neutral conductor-free electrical coupling to a multiphase electrical energy supply network, comprising:
a multiphase inductive or capacitive load unit having a number of load terminals corresponding to a number of phases of the energy supply network;
a terminal unit operable to electrically couple the energy supply network and having a number of phase terminals corresponding to a number of phases of the energy supply network, wherein each of the load terminals is electrically coupled to a respective one of the phase terminals to feed a respective phase current; and
at least one electrical reactor electrically coupled to one of the load terminals with which, during intended operation, a smallest or largest phase current occurs,
wherein during manufacture of the energy supply facility, the respective phase currents of the load terminals are detected using at least one current sensor, the phase currents are evaluated, a residual current is determined, and a reactance value of the electrical reactor is determined based on the residual current, and wherein the energy supply facility is produced according to the method as claimed in claim 1.

5. The energy supply facility of claim 4, further comprising:
an electrical contact apparatus that is electrically coupled to all of the load terminals and has contact sites electrically connected to the respective load terminals for electrical contacting of the at least one reactor.

6. The energy supply facility of claim 5, wherein the electrical contact apparatus has two electrical contact sites for each of the load terminals, and is electrically coupled to the load terminals in series.

7. The energy supply facility of claim 5, wherein the electrical contact apparatus has exactly one electrical contact site for each of the load terminals, and has one further contact site that is electrically coupled to an electrical earth potential.

8. The energy supply facility of claim 4, wherein the electrical inductance is connected in series to the load terminal at which a largest phase current occurs during intended operation.

9. The energy supply facility of claim 4, wherein an electrical capacitance is connected between the load terminal at which a smallest phase current occurs during intended operation and an electrical earth potential.

10. The energy supply facility of claim 4, further comprising:
an electrical switch element operable to activate the reactor.

11. A magnetic resonance device comprising:
a gradient power amplifier; and
an energy supply facility configured in accordance with claim 4.

* * * * *